United States Patent [19]
Yamamoto et al.

[11] Patent Number: 5,674,056
[45] Date of Patent: Oct. 7, 1997

[54] MOTOR PUMP ASSEMBLY

[75] Inventors: Masakazu Yamamoto; Yoshio Miyake; Makoto Kobayashi, all of Fujisawa, Japan

[73] Assignee: Ebara Corporation, Tokyo, Japan

[21] Appl. No.: 364,684

[22] Filed: Dec. 28, 1994

[30] Foreign Application Priority Data

Dec. 28, 1993 [JP] Japan .................... 5-350994

[51] Int. Cl.[6] .................................... F04B 17/00
[52] U.S. Cl. ........................... 417/366; 417/423.14
[58] Field of Search .................. 417/366, 369, 417/423.8, 423.14

[56] References Cited

U.S. PATENT DOCUMENTS

| | | | |
|---|---|---|---|
| 2,968,249 | 1/1961 | Caine et al. | 417/369 |
| 4,213,745 | 7/1980 | Roberts | 417/363 |
| 4,697,992 | 10/1987 | Hatakeyama et al. | 417/269 |
| 4,726,746 | 2/1988 | Takada et al. | 417/423 R |
| 4,834,624 | 5/1989 | Jensen et al. | 417/360 |
| 4,963,778 | 10/1990 | Jensen et al. | 310/68 D |
| 4,981,420 | 1/1991 | Jensen et al. | 417/423.3 |
| 4,998,865 | 3/1991 | Nakanishi et al. | 417/423.7 |
| 5,332,369 | 7/1994 | Jensen | 417/369 |
| 5,350,281 | 9/1994 | Hagshenas | 417/423.8 |
| 5,401,146 | 3/1995 | Moriya et al. | 417/423.14 |
| 5,478,215 | 12/1995 | Kobayashi et al. | 417/366 |
| 5,494,403 | 2/1996 | Kobayashi et al. | 415/182.1 |
| 5,494,413 | 2/1996 | Campen et al. | 417/423.8 |
| 5,494,418 | 2/1996 | Moriya et al. | 417/423.14 |

FOREIGN PATENT DOCUMENTS

| | | |
|---|---|---|
| 0 531 267 | 3/1993 | European Pat. Off. |
| 36 42 729 | 6/1988 | Germany. |
| 41 21 430 | 11/1992 | Germany. |
| 42 22 394 | 12/1993 | Germany. |
| 255203 | 1/1949 | Switzerland ............ 417/366 |

*Primary Examiner*—Timothy Thorpe
*Assistant Examiner*—Peter G. Korytnyk
*Attorney, Agent, or Firm*—Oblon, Spivak, McClelland, Maier & Neustadt, P.C.

[57] ABSTRACT

A motor pump assembly incorporates a motor unit and a pump unit and has an outer surface to which a heating element such as a frequency converter is attached. The motor pump assembly comprises a motor having a main shaft, a pump casing encasing the motor and having an inner surface which contacts a fluid handled by the motor pump assembly, an impeller provided on the main shaft and housed in the pump casing, and a heating element which generates heat due to an electric loss and is attached to an outer surface of the pump casing.

25 Claims, 10 Drawing Sheets

MOTOR PUMP ASSEMBLY

BACKGROUND OF THE INVENTION

1. Field of the invention

The present invention relates to a motor pump assembly incorporating a motor unit and a pump unit, and more particularly to a motor pump assembly having an outer surface to which a heating element such as a frequency converter is attached.

2. Description of the related art

There has been known a motor pump assembly in which a frequency converter is used and heat generated from the frequency converter is removed by a liquid handled by the motor pump assembly. German Patent Publication No. DE-A1-3642729 discloses such a motor pump assembly which has a bypass pipe between a discharge-side of the pump and a suction-side of the pump to cool the frequency converter by a liquid flowing therethrough. This structure enables the frequency converter to be small-sized because a heat sink for the frequency converter is unnecessary. However, the installation of the bypass pipe increases production costs of the motor pump assembly.

On the other hand, a motor can be small-sized by increasing frequency of an electric current supplied thereto. Further, a motor can be generally small-sized by maintaining a good cooling condition thereof. A centrifugal pump can be also small-sized by increasing a rotational speed thereof.

However, a conventional motor pump assembly having a frequency converter does not fulfill requirements for miniaturization thereof, and efforts for miniaturizing the whole structure of the motor pump assembly has not been made sufficiently.

SUMMARY OF THE INVENTION

It is therefore an object of the present invention to provide a motor pump assembly in which a frequency converter, a motor and a pump can be small-sized and the whole structure thereof can thus be compact.

According to the present invention, there is provided a motor pump assembly comprising: a motor having a main shaft; a pump casing encasing the motor and having an inner surface which contacts a fluid handled by the motor pump assembly; at least one impeller provided on the main shaft and housed in the pump casing; and a heating element which generates heat due to an electric loss, the heating element being attached to an outer surface of the pump casing.

According to the present invention, the frequency converter is attached to the outer surface of the pump casing of the full-circumferential flow pump. Since the fluid handled by the pump contacts the inner surface of the pump casing and the frequency converter is cooled by the fluid flow in the pump casing, a heat sink for the frequency converter is unnecessary, and hence the frequency converter can be small-sized.

According to the present invention, since the motor pump assembly comprises a full-circumferential flow pump in which the motor is surrounded by the fluid handled by the pump, a good cooling effect of the motor is obtainable. Further, the fluid handled by the pump is introduced into the rotor chamber, thereby lubricating the bearing assemblies. Thus, the motor is not affected by the heat generated by a mechanical loss in addition to an electrical loss, therefore the motor can be small-sized because of a good cooling effect and increase of frequency of an electric current supplied thereto.

According to one aspect of the present invention, since the outer cylinder, the suction-side casing and the discharge-side casing jointly serving as an outer surface of the motor pump assembly are made of a pressed sheet of stainless steel, a heat transfer from the outer surface of the pump to the fluid in the pump is carried out efficiently.

According to one aspect of the present invention, the frequency converter is housed in the case comprising the lower case, the upper case and the gasket interposed between the lower case and the upper case, and attached to the outer surface of the pump casing through the lower case. Since moisture is prevented from entering the case, the frequency converter is not deteriorated due to dew formed by moisture when cooled by the liquid handled by the pump.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
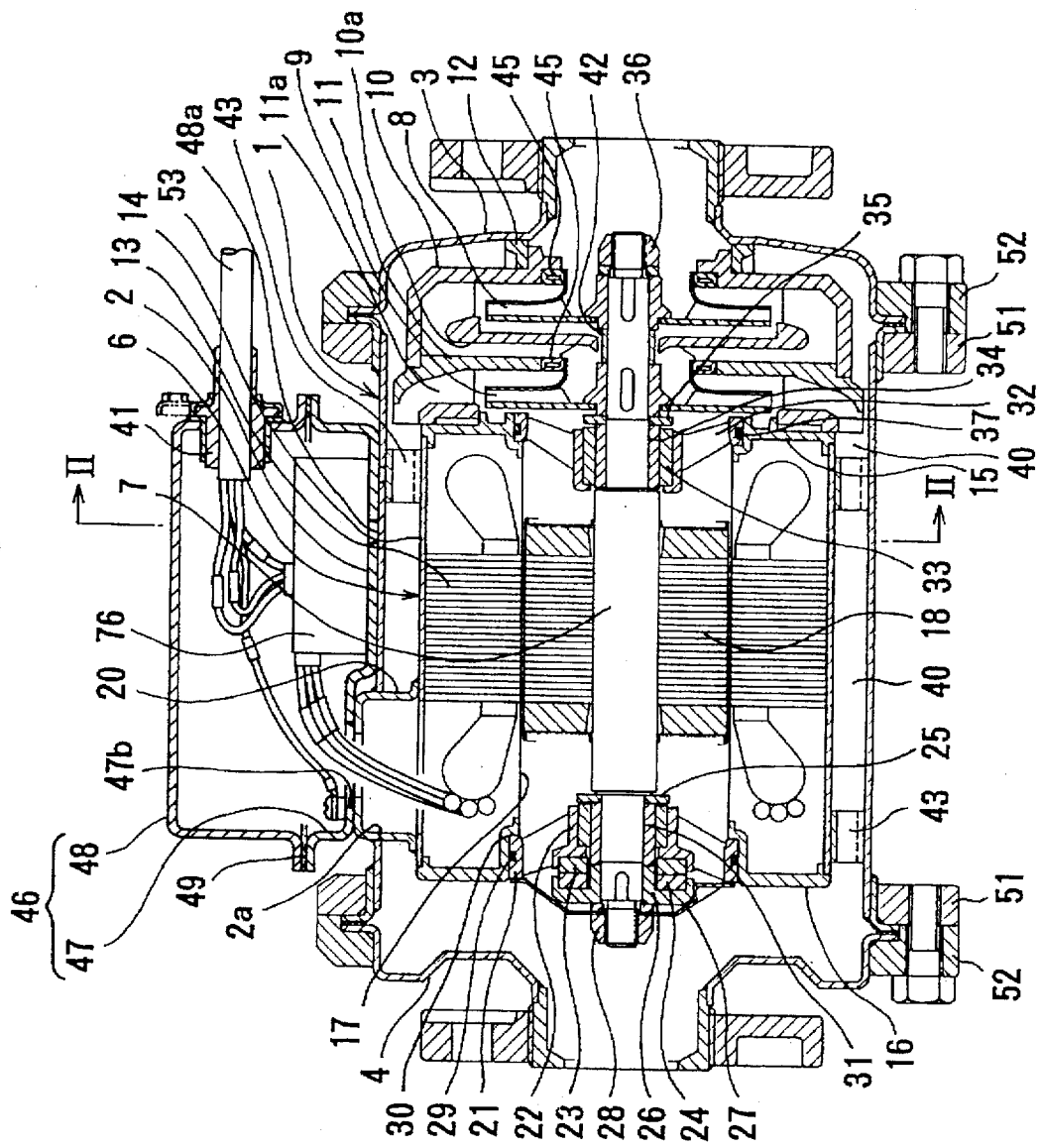
FIG. 1 is a cross-sectional view of a motor pump assembly according to a first embodiment of the present invention.
Figure 2:
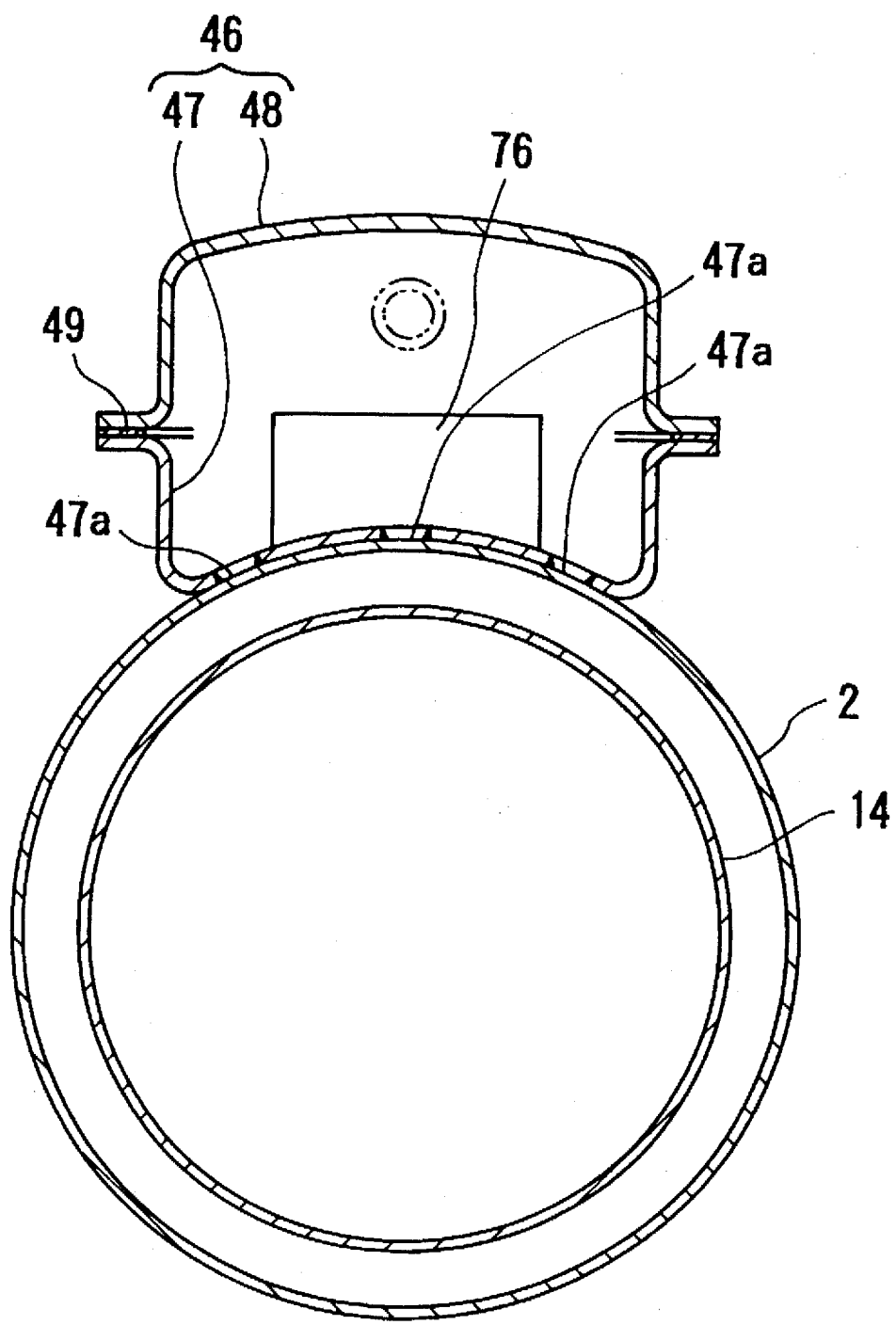
FIG. 2 is a cross-sectional view taken along line II—II of FIG. 1.

A motor pump assembly according to a first embodiment of the present invention will be described below with reference to FIGS. 1 and 2. FIG. 1 shows a full-circumferential flow inline pump as an example of a motor pump assembly of the present invention.

A full-circumferential-flow pump comprises a pump casing 1, a canned motor 6 housed in the pump casing 1, and a pair of impellers 8, 9 fixedly mounted on a main shaft 7 of the canned motor 6. The pump casing 1 comprises an outer cylinder 2, a suction-side casing 3 connected to an axial end of the outer cylinder 2 by flanges 51, 52, and a discharge-side casing 4 connected to an opposite axial end of the outer cylinder 2 by flanges 51, 52. Each of the outer cylinder 2, the suction-side casing 3, and the discharge-side casing 4 is made of a pressed sheet of stainless steel or the like.

A case 46 for housing a frequency converter 76 comprising a VVVF invertor (variable voltage variable frequency invertor) is attached to an outer surface of the outer cylinder 2. The case 46 comprises a lower case 47 fixedly secured to the outer cylinder 2, and an upper case 48 removably mounted on the lower case 47 by fastening members such as bolts. A gasket 49 is interposed between the lower case 47 and the upper case 48 to seal the interior space of the case 46 from the outside air. As shown in FIG. 2, the lower case 47 has a plurality of holes 47a at a bottom wall thereof, and is fixed to the outer surface of the outer cylinder 2 by welding through the holes 47a. The lower case 47 has a concave bottom surface which is fitted over the cylindrical outer surface of the outer cylinder 2. The frequency converter 76 also has a concave lower surface which is fitted over the concave bottom wall of the lower case 47.

The impeller 8 is housed in a first inner casing 10 having a return vane 10a, the first inner casing 10 being disposed in the pump casing 1. The impeller 9 is housed in a second inner casing 11 having a guide device 11a, and the second inner casing 11 is disposed in the pump casing 1 and connected to the first inner casing 10. A resilient seal 12 is interposed between the first inner casing 10 and the suction-side casing 3 to seal a suction side (low-pressure side) in the pump from a discharge side (high-pressure side) in the pump. Liner rings 45 are mounted on radially inner ends, respectively, of the first and second inner casings 10, 11.

The canned motor 6 comprises a stator 13, an outer motor frame barrel 14 fixedly fitted over the stator 13 and securely provided in the pump casing 1, a pair of motor frame side plates 15, 16 welded to respective opposite open ends of the outer motor frame barrel 14, and a can 17 fitted in the stator 13 and welded to the motor frame side plates 15, 16. The canned motor 6 also has a rotor 18 rotatably disposed in the stator 13 and hence the can 17, and shrink-fitted over the main shaft 7.

A cable housing 20 is welded to the outer motor frame barrel 14, and the cable housing 20 and the outer cylinder 2 are hermetically welded together. Leads from coils disposed in the outer motor frame barrel 14 are extended through the cable housing 20 and a lead hole 47b of the lower case 47, and connected to the frequency converter 76 in the case 46. Further, a cable 53 is introduced into the case 46 through a hole of the upper case 48 and connected to leads of the frequency converter 76 in the case 46. A cable holder 41 for holding the cable 53 is attached to the upper case 48.

Bearing assemblies which support the rotor assembly on anti-thrust load and thrust load sides, and components associated with such bearing assemblies will be described below.

First, the anti-thrust load side bearing assembly will be described. A radial bearing 22 and a stationary thrust bearing 23 are mounted on a bearing bracket 21 near the discharge-side casing 4. The radial bearing 22 has an end which serves as a stationary thrust sliding member. A rotary thrust bearing 24 serving as a rotary thrust sliding member and a thrust collar 25 are disposed one on each side of the radial bearing 22 and the stationary thrust bearing 23. The rotary thrust bearing 24 is secured to a thrust disk 26 which is fixed to the main shaft 7 through a sand shield 27 by a nut 28 threaded over an externally threaded surface on an end of the main shaft 7.

The bearing bracket 21 is inserted in a socket defined in the motor frame side plate 16 through a resilient O-ring 29. The bearing bracket 21 is also held against the motor frame side plate 16 through a resilient gasket 30. The radial bearing 22 is slidably supported on a sleeve 31 which is fitted over the main shaft 7.

Next, the thrust load side bearing assembly will now be described below. A radial bearing 33 is mounted on a bearing bracket 32 near the impeller 9, and slidably supported on a sleeve 34 which is fitted over the main shaft 7. The sleeve 34 is axially held against a washer 35 which is fixed to the main shaft 7 through the impeller 9, a sleeve 42, and the impeller 8 by a nut 36 threaded over an externally threaded surface on an opposite end of the main shaft 7. The bearing bracket 32 is inserted in a socket defined in the motor frame side plate 15 through a resilient O-ring 37. The bearing bracket 32 is also held against the motor frame side plate 15.

Next, a method for fixing the canned motor 6 to the pump casing 1 will be described below. The cable housing 20 is hermetically welded to the outer motor frame barrel 14, and the stays are welded to the outer motor frame barrel 14, thereby forming a canned motor assembly. Next, the canned motor assembly is inserted into the outer cylinder 2 having the hole 2a, the cable housing 20 is caused to pass through the hole 2a, and then hermetically welded to the outer cylinder 2. Further, the stays 43 and the outer cylinder 2 are welded together. An annular fluid passage 40 is formed between the outer motor frame barrel 14 and the outer cylinder 2. The rotational speed of the canned motor is set to 4,000 rpm or more by the frequency converter 76.

Operation of the full-circumferential-flow pump shown in FIG. 1 will be described below. A fluid drawn into the suction casing 3 is pressurized by the impellers 8, 9, and oriented from a radial direction into an axial direction by the guide device 11a. Therefore, the fluid flows into an annular fluid passage 40 defined between the outer cylinder 2 and the outer motor frame barrel 14, and then flows through the annular fluid passage 40 into the discharge-side casing 4.

From the discharge-side casing 4, most of the fluid is discharged through a discharge port out of the pump. The remaining fluid passes behind the sand shield 27 into a rotor chamber in which it lubricates the bearings 22, 23, 24 and 35. Thereafter, the fluid flows through an opening defined in the bearing bracket 32, and joins the fluid which is discharged from the impeller 9.

According to the this embodiment, the frequency converter 76 is attached to the outer surface of the pump casing 1 of the full-circumferential flow pump. Since the fluid handled by the pump and flowing through the fluid passage 40 contacts the inner surface of the pump casing 1 and the frequency converter 76 is cooled by the fluid flow in the pump casing 1, a heat sink for the frequency converter 76 is unnecessary, and hence the frequency converter 76 can be small-sized.

According to this embodiment, since the motor pump assembly comprises a full-circumferential flow pump in which the motor is surrounded by the fluid handled by the pump, a good cooling effect of the motor is obtainable. Further, the fluid handled by the pump is introduced into the rotor chamber, thereby lubricating the bearing assemblies. Thus, the motor is not affected by the heat generated by a mechanical loss in addition to an electrical loss, therefore the motor can be small-sized because of a good cooling effect and increase of frequency of an electric current supplied thereto.

According to this embodiment, since the outer cylinder 2, the suction-side casing 3 and the discharge-side casing 4 jointly serving as an outer surface of the motor pump assembly are made of a pressed sheet of stainless steel, a heat transfer from the outer surface of the pump to the fluid in the pump is carried out efficiently.

According to this embodiment, the frequency converter 76 is housed in the case 46 comprising the lower case 47, the upper case 48 and the gasket 49 interposed between the lower case 47 and the upper case 48, and attached to the outer surface of the pump casing 1 through the lower case 47. Since moisture is prevented from entering the case 46, the frequency converter 76 is not deteriorated due to dew formed by moisture when cooled by the liquid handled by the pump.

According to this embodiment, the hole 47a is formed in the lower case 47, and the lower case 47 is fixed to the outer surface of the outer cylinder 2 by welding through the hole 47a. Thus, the case 46 and the outer cylinder 2 of the pump casing 1 contact closely with each other, and the heat generated from the frequency converter 76 can be transferred to the pump efficiently.

Figure 3:
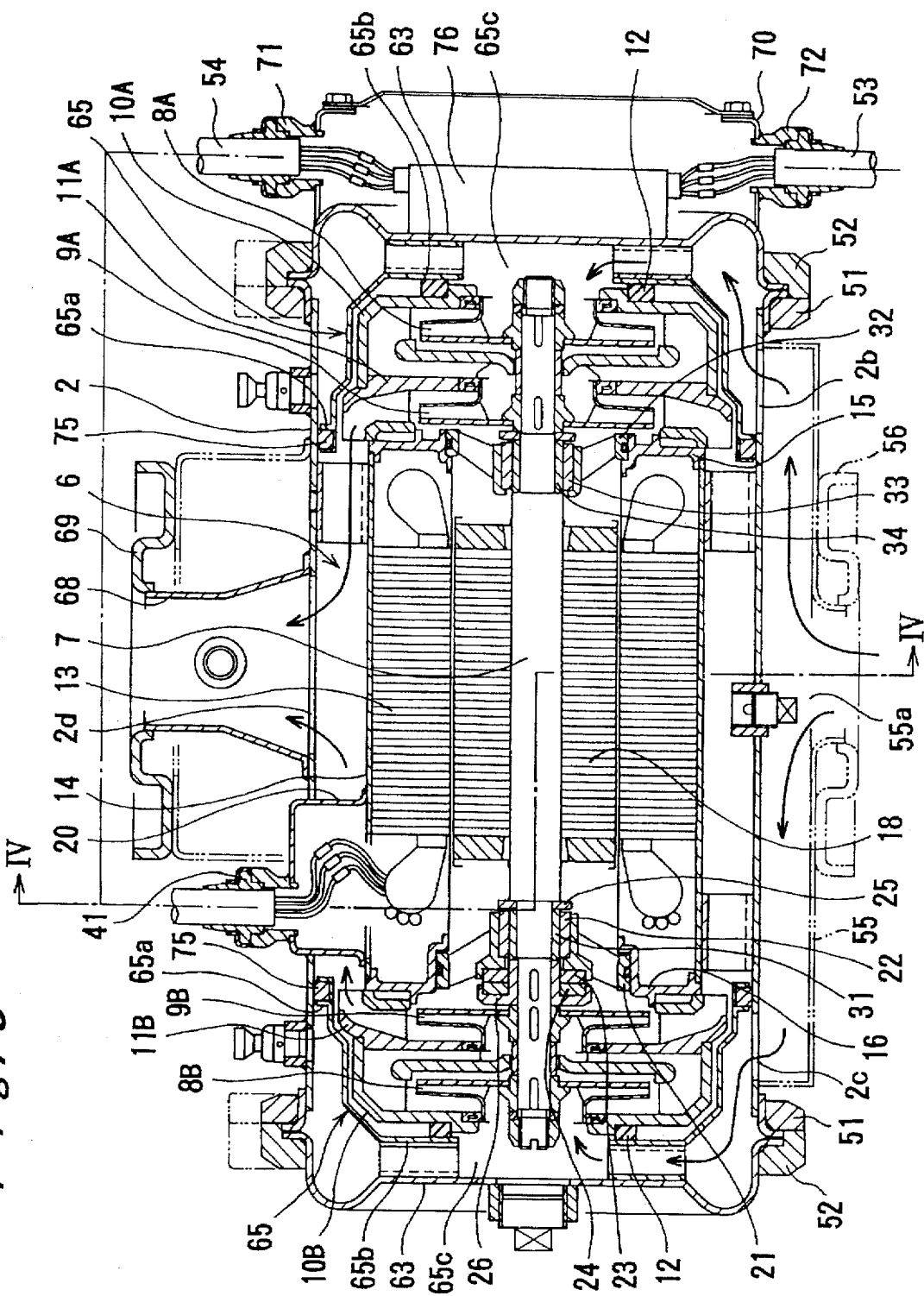
FIG. 3 is a cross-sectional view of a motor pump assembly according to a second embodiment of the present invention.

FIG. 3 shows a second embodiment of a full-circumferential flow pump according to the present invention. The full-circumferential flow pump of this embodiment is of a double suction type. The parts shown in FIG. 3 which are identical to those of FIG. 1 are denoted by identical reference numerals.

Figure 4:
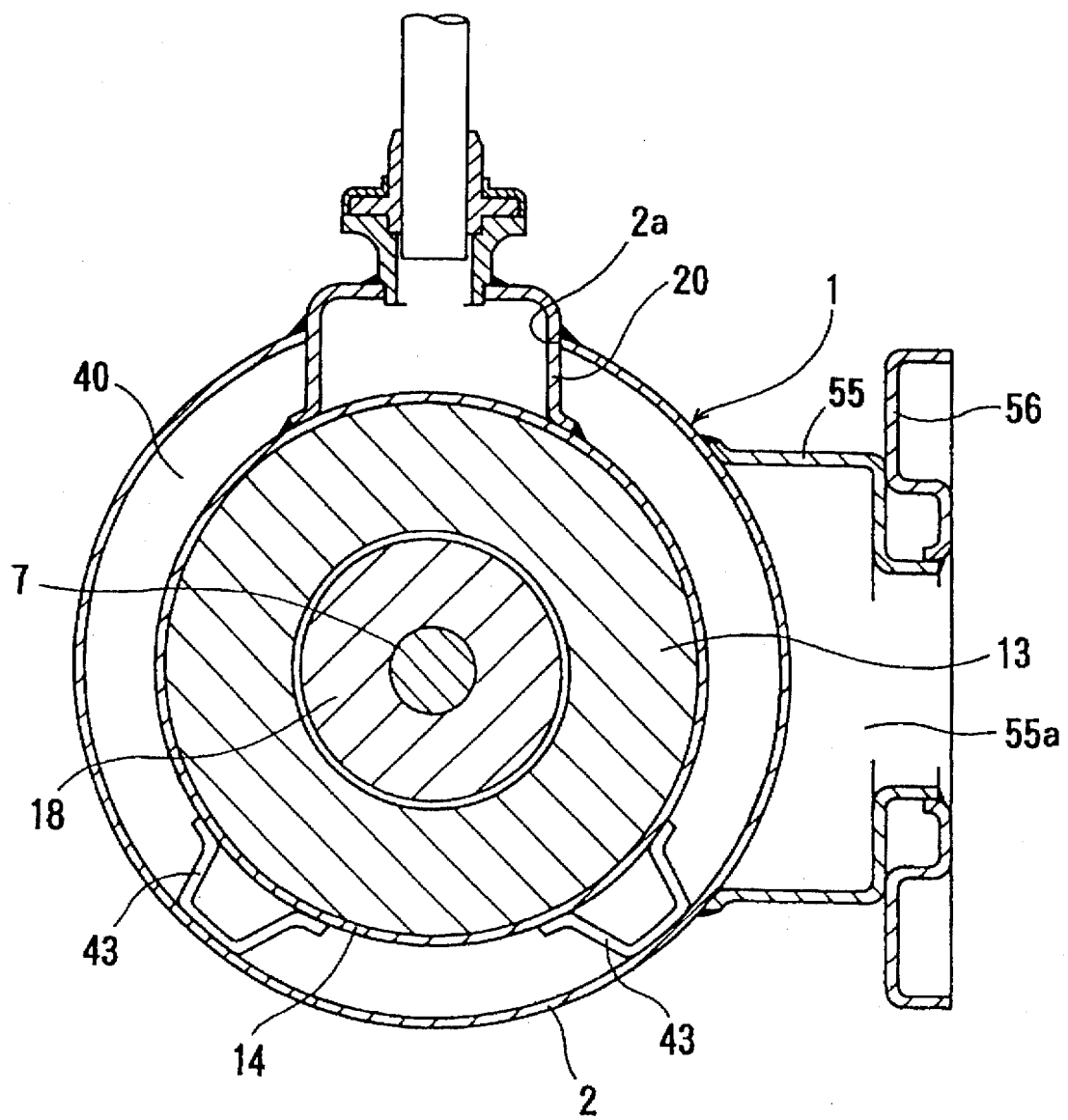
FIG. 4 is a cross-sectional view taken along line IV—IV of FIG. 3.

The full-circumferential flow pump of double suction type has a canned motor 6 having the same structure as that of FIG. 1, at a central part in a pump casing 1 as shown in FIG. 3. Impellers 8A and 9A and 8B and 9B each having a suction port opened axially outwardly are fixed to the respective ends of the main shaft 7 of the canned motor 6. The pump casing 1 comprises an outer cylinder 2 and covers 63 connected to the respective ends of the outer cylinder 2. The covers 63 are fixed by flanges 51 and 52 to the respective ends of the outer cylinder 2. A cable housing 20 is fixed to the outer motor frame barrel 14. In the vicinity of both ends of the outer cylinder 2, there are provided suction windows 2b and 2c which are connected by a suction cover 55. The suction cover 55 is connected to the outer cylinder 2 in the manner as shown in FIG. 4. A pump suction port 55a is formed in the central potion of the suction cover 55 and a suction flange 56 is fixed thereto.

One of the covers 63 has an outer surface to which a frequency converter 76 is attached. In order to cover the frequency converter 76, there is provided a receptacle-like cover 70 which is welded to the cover 63. The cover 70 has side walls to which cable holders 71 and 72 are fixed by welding. A cable 53 for supplying an electric power to the frequency converter 76 is held by the cable holder 72, and a cable 54 for connecting the frequency converter 76 and the coils of the stator 13 is held by the cable holder 71. The end of the cable 54 is held by a cable holder 41 attached to the cable housing 20. Leads from coils disposed in the outer motor frame barrel 14 are extended radially and connected to the cable 54 in the cable housing 20.

Partition members 65 each having substantially cylindrical receptacle shape are fixedly provided in the outer cylinder 2. Seal members 75 are fixed to the respective flange portions 65a of the partition members 65. A suction opening 65c is formed in the bottom portion of each of the partition members 65. In the interiors of the partition members 65, there are provided first inner casings 10A and 10B and second inner casings 11A and 11B, respectively. A discharge port 2d is formed in the central portion of the outer cylinder 2 and an discharge nozzle 68 is connected thereto. A discharge flange 69 is integrally fixed to the discharge nozzle 68. The structure of the canned motor 6 is the same as that of FIG. 1.

The full-circumferential-flow double suction pump shown in FIGS. 3 and 4 operates as follows: A fluid which is drawn in through the suction port 55a is divided by the suction cover 55 into two fluid flows which are introduced into the pump assemblies through the suction windows 2b, 2c. The fluid flows introduced into the pump assemblies flow through the suction openings 65c, 65c into the first inner casings 10A, 10B and the second inner casings 11A, 11B in which the fluid flows are pressurized by the impellers 8A, 8B, 9A, 9B. The fluid flows discharged from the impellers 8A, 8B flow into the impellers 9A, 9B, from which the fluids flow radially outwardly through the guide devices and then axially into the annular fluid passage 40 defined between the outer cylinder 2 and the outer motor frame barrel 14. The fluid flow passing through the annular fluid passage 40 merges in the middle of the annular fluid passage 40 and is then discharged through the opening 2d of the outer cylinder 2 and the discharge nozzle 68 from the discharge port.

The motor pump assembly of the second embodiment has the same advantages as that of FIG. 1. Further, according to the second embodiment of FIGS. 3 and 4, the frequency converter 76 is attached to the cover 63 which is not subject to a discharge pressure of the pump. In general, the frequency converter comprising integrated circuit is adversely affected by vibration or deformation. Since the pressure fluctuation is large at the time of starting or stopping of the pump, the pump casing made of sheet metal is liable to be deformed at the portions which is subject to a discharge pressure of the pump. On the contrary, since the pressure fluctuation is small at the suction-side of the pump compared with the discharge-side of the pump and the frequency converter 76 is attached to the portions of the suction-side of the pump, the frequency converter 76 is not affected by the deformation of the pump casing.

Figure 5:
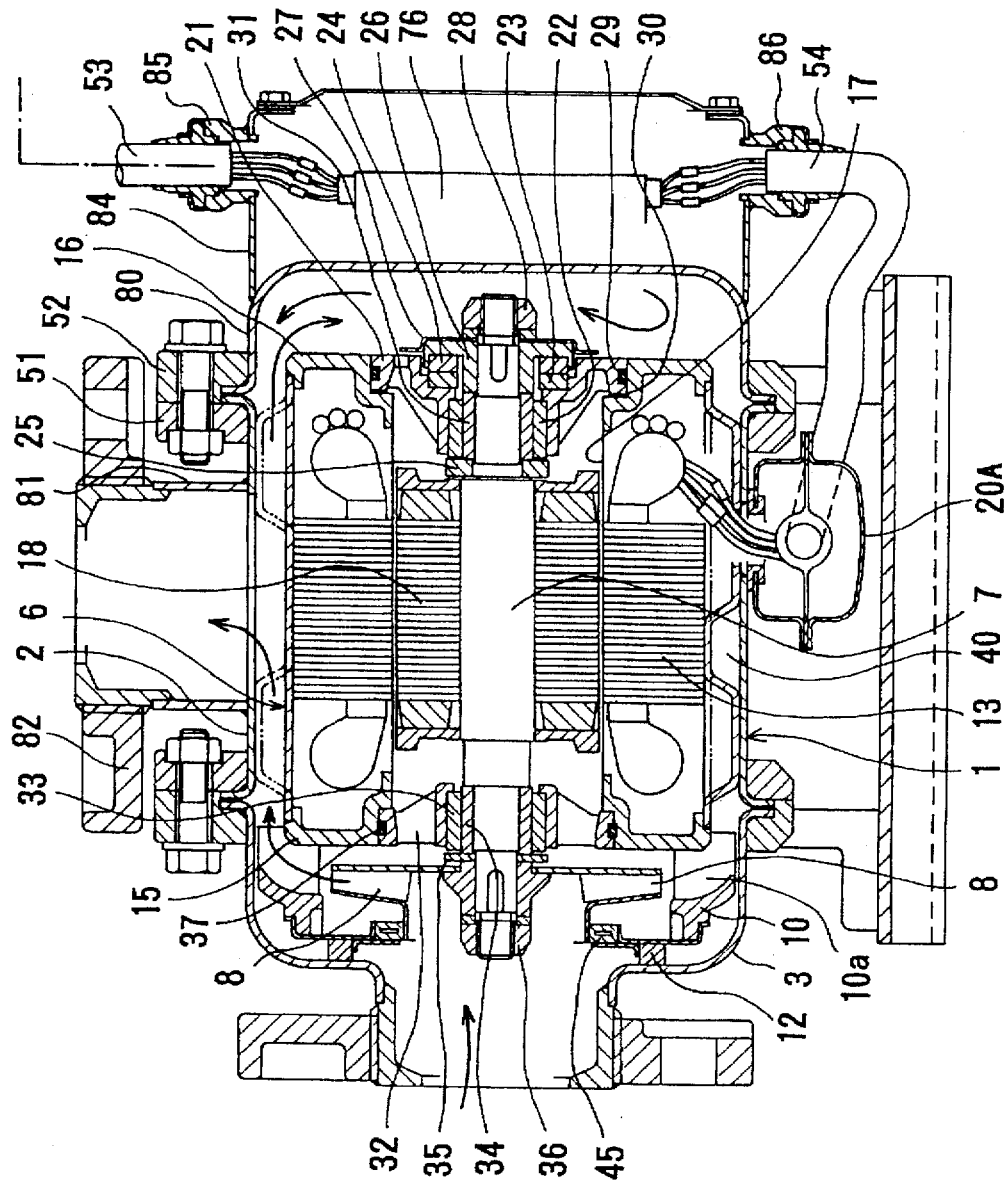
FIG. 5 is a cross-sectional view of a motor pump assembly according to a third embodiment of the present invention.

FIG. 5 shows a third embodiment of a motor pump assembly according to the present invention. The motor pump assembly of this embodiment is of an end-top type. In this embodiment, a single impeller 8 is fixed to an end of a main shaft 7 of a canned motor 6 having the same structure as that of FIG. 1. A pump casing 1 comprises an outer cylinder 2, a suction-side casing 3 and a cover 80 which are fixed by flanges 51 and 52 to the respective ends of the outer cylinder 2.

A discharge nozzle 81 is welded to the outer cylinder 2, and a discharge flange 82 is fixed to the discharge nozzle 81. The cover 80 has an outer surface to which a frequency converter 76 is attached. In order to cover the frequency converter 76, there is provided a receptacle-like cover 84 which is welded to the cover 80. The cover 84 has side walls to which cable holders 85 and 86 are fixed by welding. A cable 53 for supplying an electric power to the frequency converter 76 is held by the cable holder 85, and a cable 54 for connecting the frequency converter 76 and the coils of the stator 13 is held by the cable holder 86. Leads from coils disposed in the outer motor frame barrel 14 are extended radially outwardly and connected to the cable 54 in the cable housing 20A. The other structure is the same as that of FIG. 1. The motor pump assembly of the third embodiment has the same advantages as that of FIG. 3.

In this embodiment, a fluid drawn from the suction port of the suction-side casing 3 flows into the impeller 8, and then is directed by the guide device 10a of the inner casing 10 to flow axially through an annular fluid passage 40 radially defined between the outer cylinder 2 and the outer motor frame barrel 14. The fluid then flows from the annular fluid passage 40 into the discharge nozzle 81, and is discharged from the discharge port of the discharge nozzle 81. On the other hand, a part of fluid which flows in the annular fluid passage 40 flows into a space between the cover 80 and the canned motor 6, and then flows into a rotor chamber through a clearance between the sand collar 27 and the bearing bracket 21. Thereafter the fluid flows through an opening of the bearing bracket 32, and joins the fluid which is discharged from the impeller 8. The frequency converter 76 is cooled by the fluid flowing inside the cover 80.

Figure 6:
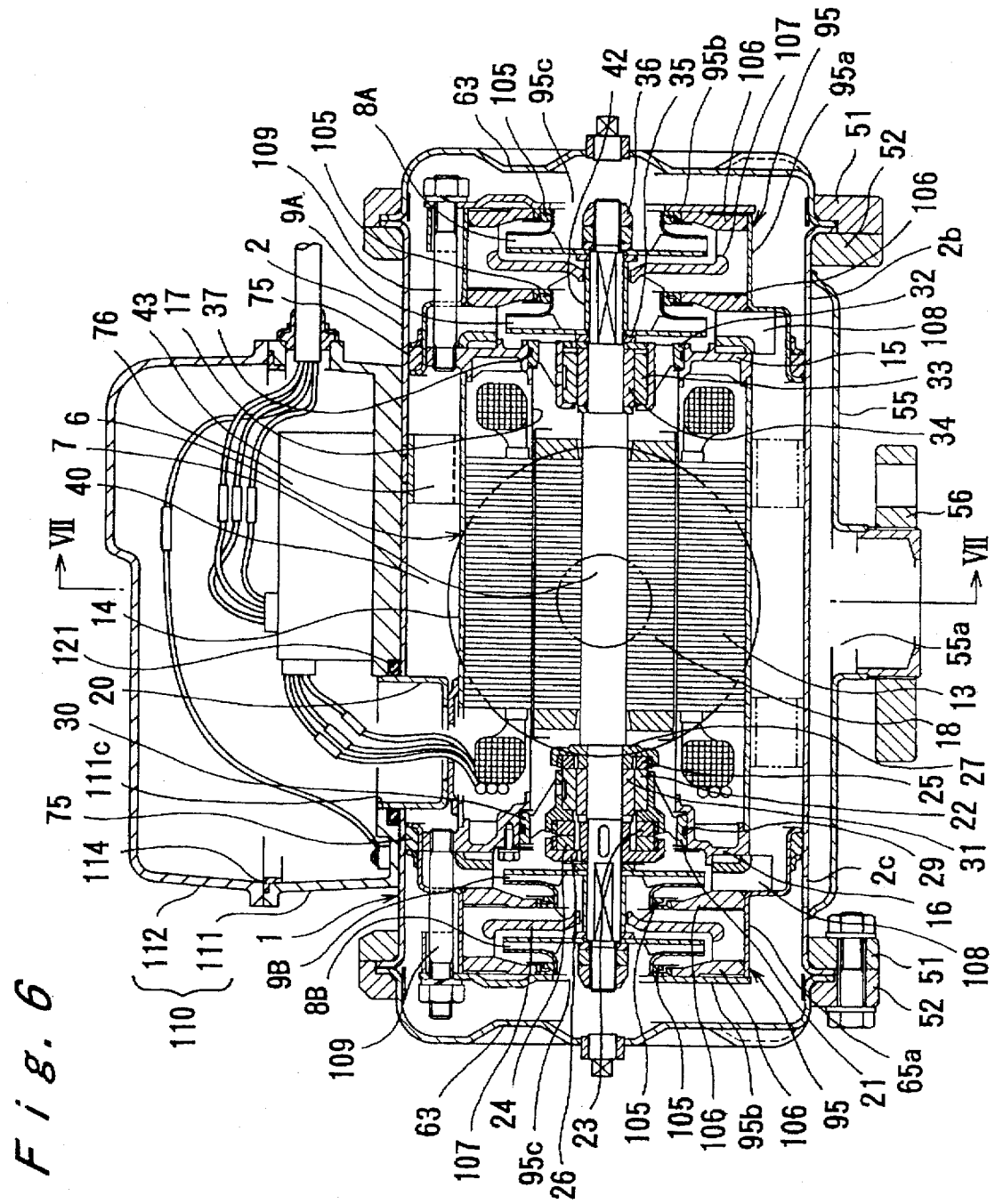
FIG. 6 is a cross-sectional view of a motor pump assembly according to a fourth embodiment of the present invention.
Figure 7:
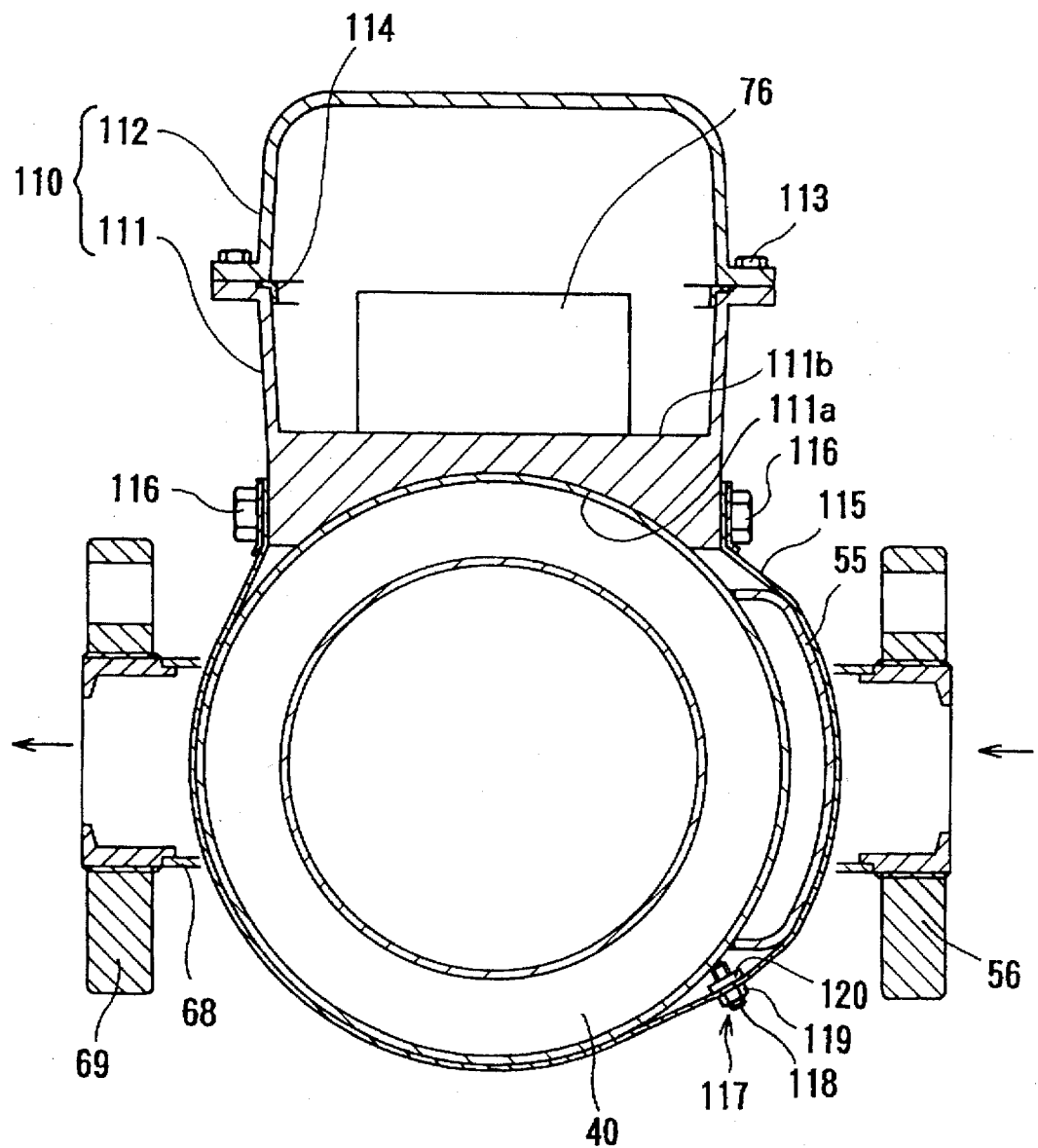
FIG. 7 is a cross-sectional view taken along line VII—VII of FIG. 5.

FIGS. 6 and 7 show a fourth embodiment of a motor pump assembly comprising a full-circumferential flow pump according to the present invention. The full-circumferential flow pump of this embodiment is of a double suction type. The parts shown in FIG. 6 which are identical to those of FIG. 1 are denoted by identical reference numerals.

The full-circumferential flow pump of double suction type has a canned motor 6 having the same structure as that of FIG. 1. The canned motor 6 is disposed in a pump casing 1. Impellers 8A and 9A and 8B and 9B each having a suction port opened axially outward are fixed to the respective ends of the main shaft 7 of the canned motor 6. A cable housing 20 is fixed to the outer motor frame barrel 14. Covers 63 are fixed by flanges 51 and 52 to both ends of an outer cylinder 2. Each of the outer cylinder 2 and the covers 63 jointly constituting the pump casing 1 are made of a pressed sheet of stainless steel or the like. In the vicinity of both ends of the outer cylinder 2, there are provided suction windows 2b and 2c which are connected by a suction cover 55. The suction cover 55 is connected to the outer cylinder 2. A pump suction port 55a is formed in the central potion of the suction cover 55 and a suction flange 56 is fixed thereto.

Inner casings 95 each comprising a cylindrical member 95a and a cover 95b and having a substantially cylindrical receptacle body are fixedly provided in the outer cylinder 2. Seal members 75 are fixed to the inner casings portions of the inner casings 95. A suction opening 95c is formed in the cover 95b of each of the inner casings 95. In each of the inner casings 95, there are provided supporting members 106 having a liner ring 105 on the respective inner ends thereof, a return blade 107 for guiding fluid discharged from the first-stage impeller 8A or 8B towards the second-stage impeller 9A or 9B and a guide device 108 for guiding fluid discharged from the second-stage impeller 9A or 9B towards the annular fluid passage 40. The inner casings 95 are fixed to the motor frame side plates 15 and 16 by bolts 109, respectively. A discharge port (not shown) is formed in the central portion of the outer cylinder 2 and an discharge nozzle 68 is connected thereto as shown in FIG. 7. A discharge flange 69 is fixed to the discharge nozzle 68.

A case 110 for housing a frequency converter 76 is attached to an outer surface of the outer cylinder 2. The case 110 comprises a lower case 111 fixedly secured to the outer cylinder 2, and an upper case 112 removably mounted on the lower case 111 by bolts 113 as shown in FIG. 7. The lower and upper cases 111 and 112 are made of aluminum alloy. A gasket 114 is interposed between the lower case 111 and the upper case 112. The lower and upper cases 111 and 112 contact with each other at the outer side of the gasket 114. The lower case 111 has a concave lower surface 111a which is fitted over the cylindrical outer surface of the outer cylinder 2, and a flat upper surface 111b to which the frequency converter 76 is attached.

A fastening band 115 wound around the outer surface of the motor pump assembly has the respective ends which are fixed to the lower case 111 by bolts 116. The lower case 111 is fixedly secured to the outer surface of the motor pump assembly by a fastening force of the fastening band 115.

A fastening mechanism 117 comprising a screw 118, and nuts 119 and 120 clamping the fastening band 115 is provided at the intermediate portion of the fastening band 115. The fastening force of the fastening hand 115 can be adjusted by projecting or retracting the screw 118 relative to the nuts 119 and 120.

The lower case 111 has a hole 111c into which the cable housing 20 is fitted. That is, the lower case 111 and the cable housing 20 are joined to each other by a socket-and-spigot joint, so that the lower case 111 is located at a predetermined position relative the cylindrical surface of the motor pump assembly. A gasket 121 is interposed between the lower case 111 and the cable housing 20.

Leads from the coil of the stator 13 are extended radially across the annular fluid passage 40 through the cable housing 20 and connected to the frequency converter 76 in the case 110 which is located at the position where the leads are taken out from the outer cylinder 2. A component such as a terminal which generates no heat or a small amount of heat is attached to the upper case 111.

According to the fourth embodiment, the frequency converter 76 is attached to the outer surface of the pump casing 1 of the full-circumferential flow pump. Since the fluid handled by the pump contacts the inner surface of the pump casing 1 and the frequency converter 76 is cooled by the fluid flow in the pump casing 1, a heat sink for the frequency converter 76 is unnecessary, and hence the frequency converter 76 can be small-sized. Further, since the case 110 contacts the outer surface of the pump casing 1 of the full-circumferential flow pump by a fastening force of the fastening band 115, heat generated from the frequency converter 76 constituting a heating element is transferred to the pump and dissipated therefrom.

According to this embodiment, since the case 115 for housing the frequency converter 76 is not welded to the pump casing 1, material of the case 110 can be selected freely. Therefore, the case 110 can be made of aluminum alloy which has a good thermal conductivity. Further, the gasket 114 is interposed between the lower case 111 and the upper case 112, and the lower and upper cases 111 and 112 contact directly with each other at the outer side of the gasket 114. Therefore, heat generated from the frequency converter 76 is transferred to the pump casing, or radiated to the outside air.

According to this embodiment, the fastening band 115 comprises a thin material made of a stainless steel plate as well as the outer cylinder 2 and the suction cover 55 jointly serving as an outer surface of the motor pump assembly. Thus, heat generated from the frequency converter 76 is transferred to the fastening band 115 through the case 110, and radiated from the fastening band 115 to the outside air. Further, since material of the pump casing 1 which contacts the case 110 housing the frequency converter 76 is the same as that of the fastening band 115, the coefficient of thermal expansion of the pump casing 1 is the same as that of the fastening band 115, then the case 110 can be fixed to the pump casing 1 by a constant fastening force of the fastening band 115.

According to this embodiment, when the frequency converter is replaced with one with a larger output, a stay or a seat for attaching the frequency converter to the pump casing 1 is not required, and hence the frequency converter can be easily replaced. Further, even if the pump casing 1 is subject to the internal pressure of the liquid handled by the pump, the pump casing is prevented from being deformed because of the fastening force of the fastening band 115.

Figure 8:
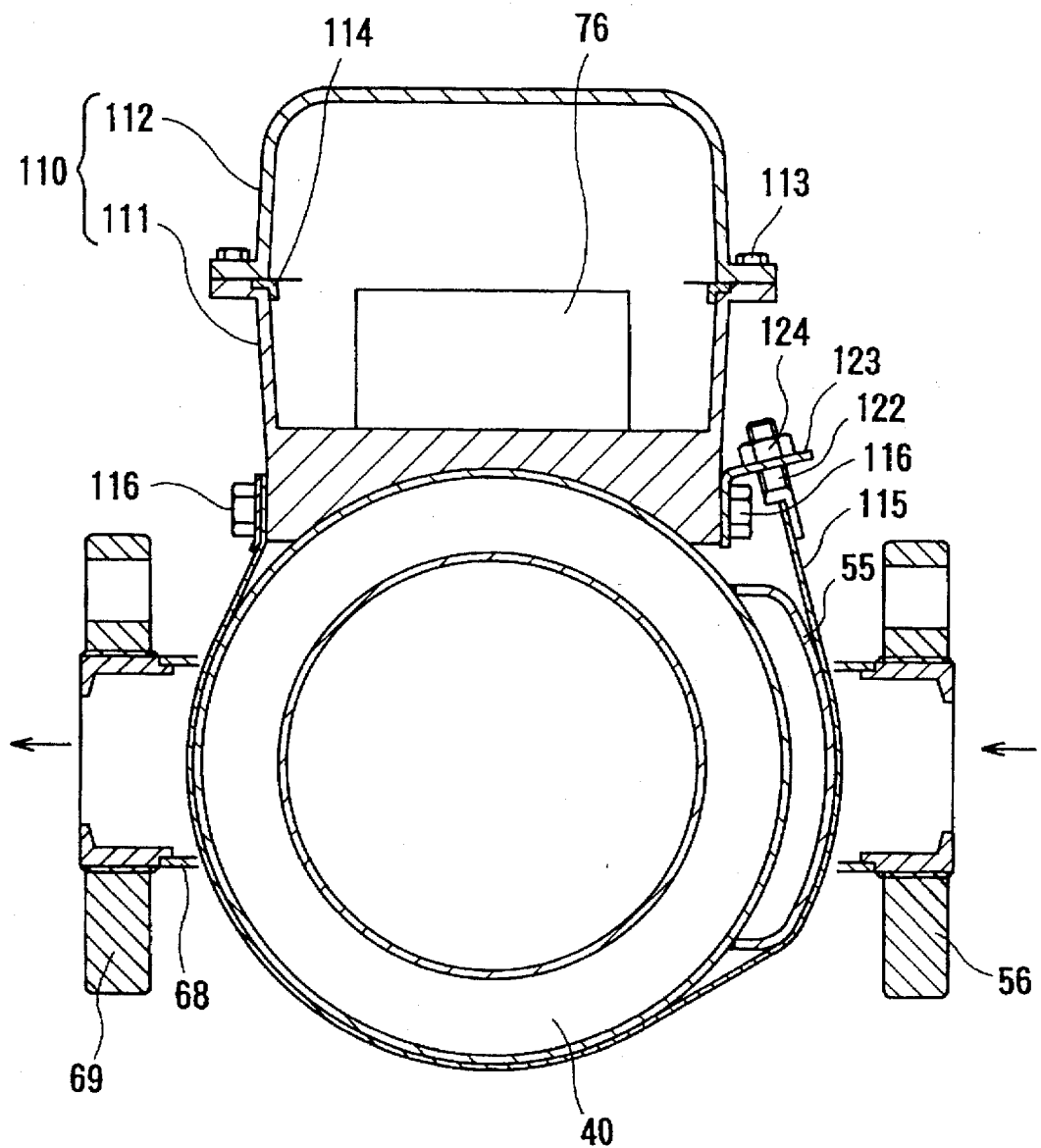
FIG. 8 is a cross-sectional view of a motor pump assembly according to a fifth embodiment of the present invention, and a view corresponding to FIG. 7.

FIG. 8 shows a motor pump assembly according to a fifth embodiment of the present invention. In this embodiment, the case 110 is the same as that of FIGS. 6 and 7, but a method for fixing the fastening band 115 is different from that of FIGS. 6 and 7. The fastening band 115 has one end which is fixed to the lower case 111 by the bolt 116 and another end to which a screw 122 is fixed. On the other hand, a L-shaped bracket 123 is fixed to the lower case 111 by the bolt 116. The screw 122 fixed to the end of the fastening band 115 is caused to pass through a hole of the bracket 123, and a nut 124 is threaded over the screw 122, whereby the lower case 111 is fixed to the motor pump assembly by the fastening band 115. In this case, the screw 122, the bracket 123 and the nut 124 jointly serve as a fastening mechanism. The other structure is the same as that of FIGS. 6 and 7.

Figure 9:
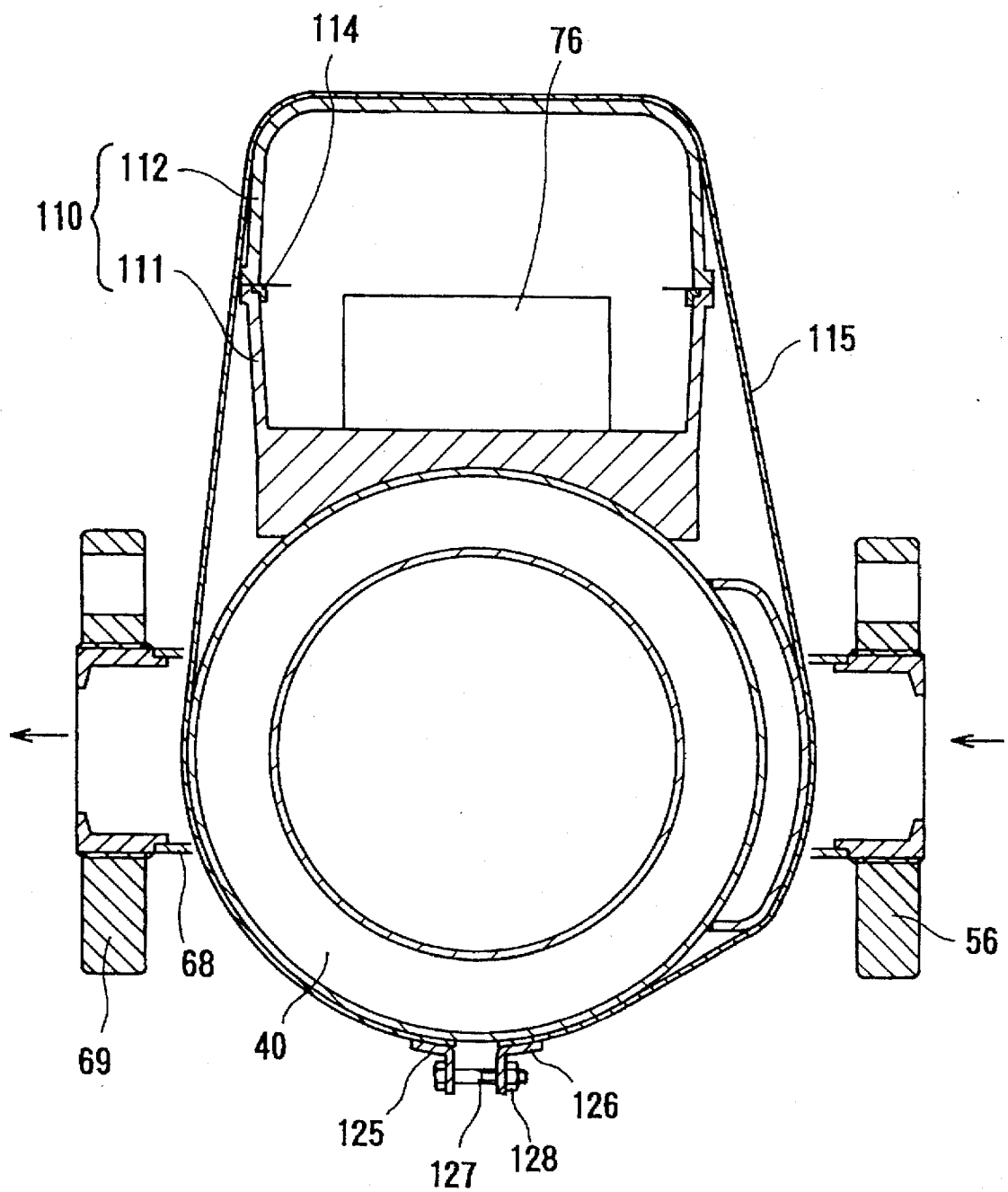
FIG. 9 is a cross-sectional view of a motor pump assembly according to a sixth embodiment of the present invention, and a view corresponding to FIG. 7.

FIG. 9 shows a motor pump assembly according to a sixth embodiment of the present invention. In this embodiment, the fastening band 115 is wound around the case 110 and the motor pump assembly. The fastening band 115 has the respective ends to which L-shaped fixtures 125 and 126 are fixed. The fixtures 125 and 126 are fastened by a bolt 127 and a nut 128, whereby the case 110 is fixed to the motor pump assembly by a fastening force of the fastening band 115. Further, the lower and upper cases 111 and 112 are fixed to each other by the fastening band 115. A fastening member such as a bolt for connecting the lower and upper cases 111 and 112 with each other is not provided. Incidentally, in the embodiments of FIGS. 6 through 9, at least a part of the fastening band may be made of elastic material such as rubber.

Figure 10A:
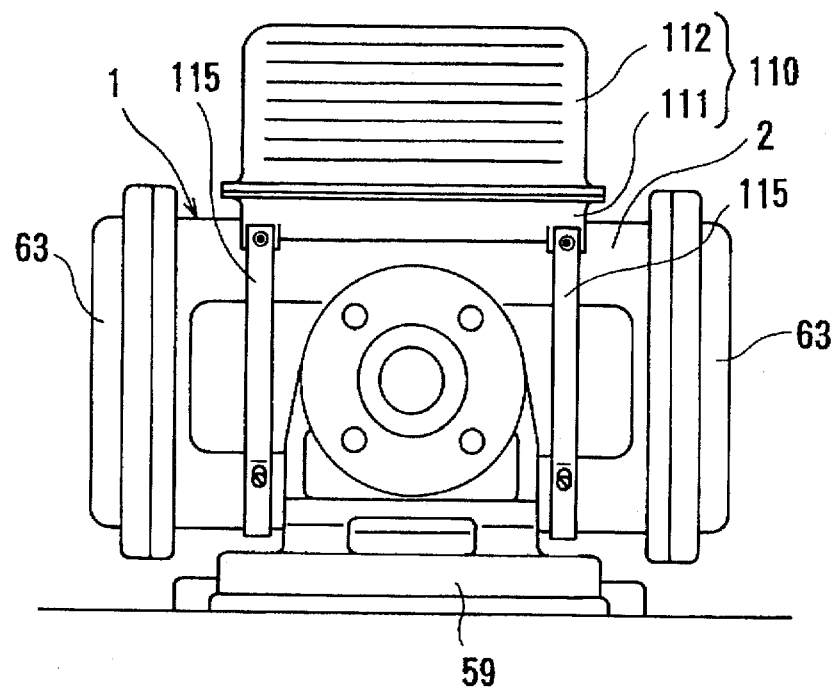
FIG. 10A is a front view showing the appearance of the motor pump assembly of FIG. 6.
Figure 10B:
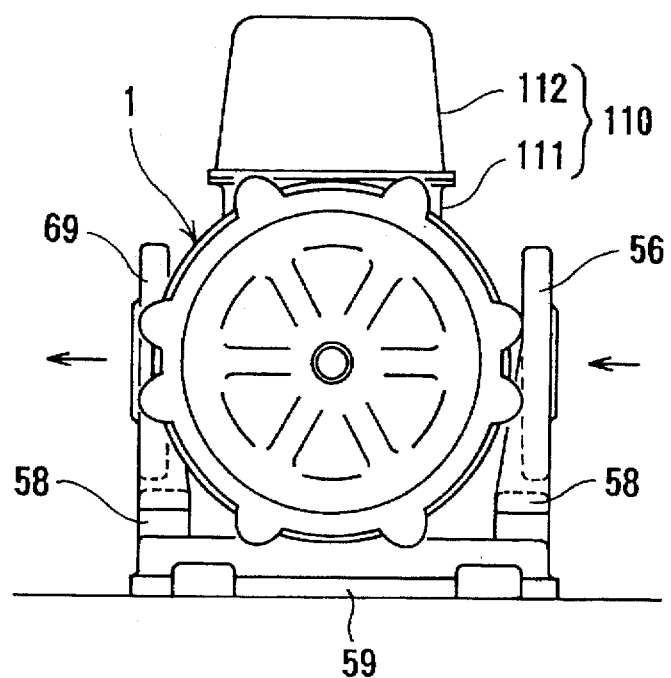
FIG. 10B is a side view showing the appearance of the motor pump assembly of FIG. 6.

FIGS. 10A and 10B show the appearance of the motor pump assembly of the present invention. As shown in FIGS. 10A and 10B, the motor pump assembly has a suction nozzle having the suction flange 56 and a discharge nozzle having a discharge flange 69 at the both sides thereof. The case 110 for housing the frequency converter 76 is fixed to the upper part of the motor pump assembly. The fastening bands 115 for fixing the case 110 to the motor pump assembly are provided in spaced relationship with each other. Legs 58 and 58 are fixed to the suction flange 56 and the discharge flange 69, respectively. Further, the legs 58 and 58 are fixed to a base 59.

As is apparent from the above description, according to the present invention, the frequency converter can be small-sized because of its good cooling condition, the motor can be small-sized by the use of the frequency converter in addition to its good cooling condition, and the pump can be small-sized by increasing its rotational speed. Therefore, the whole structure of the motor pump assembly can be compact.

Although certain preferred embodiments of the present invention has been shown and described in detail, it should be understood that various changes and modifications may be made therein without departing from the scope of the appended claims.

What is claimed is:

1. A motor pump assembly comprising:
   a motor having a main shaft;
   a pump casing encasing said motor and having an inner surface which contacts a fluid handled by the motor pump assembly;
   at least one impeller provided on said main shaft and housed in said pump casing for pumping the fluid, the pump casing defining a fluid passage through which flows at least a main part of the fluid handled by the motor pump assembly; and
   a heating element comprising a frequency converter which generates heat due to an electric loss, said heating element being attached to an outer surface of said pump casing at a position corresponding to said fluid passage.

2. The motor pump assembly according to claim 1, wherein the rotational speed of said motor is set to 4,000 rpm or more by said frequency converter.

3. The motor pump assembly according to claim 1, wherein at least a part of said pump casing is made of sheet metal, and said heating element is attached to said part made of sheet metal.

4. The motor pump assembly according to claim 1, further comprising a case housing said heating element, said heating element being attached to said outer surface of said pump casing through said case.

5. A motor pump assembly comprising:
   a motor having a main shaft;
   a pump casing encasing said motor and having an inner surface which contacts a fluid handled by the motor pump assembly;
   at least one impeller provided on said main shaft and housed in said pump casing; and
   a heating element comprising a frequency converter which generates heat due to an electric loss, said heating element being attached to an outer surface of said pump casing;
   wherein said pump casing encases said motor with a fluid passage defined therebetween, leads from said motor are extended radially across said fluid passage and connected to said heating element.

6. A motor pump assembly comprising:
   a motor having a main shaft;
   a pump casing encasing said motor and having an inner surface which contacts a fluid handled by the motor pump assembly;
   at least one impeller provided on said main shaft and housed in said pump casing;
   a heating element comprising a frequency converter which generates heat due to an electric loss, said heating element being attached to an outer surface of said pump casing; and
   a case housing said heating element, said heating element being attached to said outer surface of said pump casing through said case;
   wherein said case has a hole at a bottom wall thereof, and is fixed to said outer surface of said pump casing by welding through said hole.

7. A motor pump assembly comprising:
   a motor having a main shaft;
   a pump casing encasing said motor and having an inner surface which contacts a fluid handled by the motor pump assembly;
   at least one impeller provided on said main shaft and housed in said pump casing;
   a heating element comprising a frequency converter which generates heat due to an electric loss, said heating element being attached to an outer surface of said pump casing; and
   a case housing said heating element, said heating element being attached to said outer surface of said pump casing through said case;
   wherein said case has a hole, at said bottom wall, through which leads from said motor are introduced into said case.

8. A motor pump assembly comprising:

a motor having a main shaft;

a pump casing encasing said motor and having an inner surface which contacts a fluid handled by the motor pump assembly;

at least one impeller provided on said main shaft and housed in said pump casing; and a heating element comprising a frequency converter which generates heat due to an electric loss, said heating element being attached to an outer surface of said pump casing;

wherein said heating element is attached to a portion of said pump casing which is not subject to a discharge pressure of said motor pump assembly.

9. A motor assembly comprising:

a motor having a main shaft;

an outer cylindrical pump casing disposed around said motor with an annular space defined therebetween, said outer cylindrical pump casing having a suction window for introducing a fluid therethrough;

a pump assembly mounted on an end of said main shaft for pumping a fluid into said annular space;

a suction case mounted on an outer circumferential surface of said outer cylindrical pump casing and having a suction port defined therein for introducing a fluid therethrough and through said suction window into said pump assembly;

a partition wall disposed in said outer cylindrical pump casing and dividing the interior space of said outer cylindrical pump casing into a suction pressure side communicating with said suction window and a discharge pressure side communicating with said annular space;

covers detachably mounted on respective ends of said outer cylindrical pump casing, said cover having an inner surface which contacts a fluid handled by the motor pump assembly and serving as a maintenance member for said pump assembly; and a heating element which generates heat by an electric loss, said heating element being attached to an outer surface of said cover.

10. The motor pump assembly according to claim 9, wherein said heating element comprises a frequency converter.

11. The motor pump assembly according to claim 10, wherein the rotational speed of said motor is set to 4,000 rpm or more by said frequency converter.

12. A motor pump assembly comprising:

a motor having a main shaft;

a pump casing encasing said motor and having an inner surface which contacts a fluid handled by the motor pump assembly;

at least one impeller provided on said main shaft and housed in said pump casing for pumping the fluid, the pump casing defining a fluid passage through which flows at least a main part of the fluid handled by the motor pump assembly;

a heating element comprising a frequency converter which generates heat due to an electric loss;

a case housing said heating element; and a fastening member for fixing said case to said pump casing in such a manner that an attachment surface of said case contacts said outer surface of said pump casing by fastening force of said fastening member;

wherein said case is attached to said outer surface of said pump casing at a position corresponding to said fluid passage.

13. The motor pump assembly according to claim 12, wherein said heating element comprises a frequency converter.

14. The motor pump assembly according to claim 13, wherein the rotational speed of said motor is set to 4,000 rpm or more by said frequency converter.

15. The motor pump assembly according to claim 12, wherein at least a part of said pump casing is made of sheet metal, and said heating element is attached to said part made of sheet metal.

16. The motor pump assembly according to claim 12, wherein at least a part of said case is made of aluminum alloy.

17. The motor pump assembly according to claim 12, wherein said fastening member comprises a thin plate made of steel plate.

18. The motor pump assembly according to claim 12, wherein said fastening member has one end which is fixed to said case and a free end, and a fastening mechanism is provided at said free end of said fastening member so that said fastening force of said fastening member is adjusted.

19. The motor pump assembly according to claim 12, wherein said fastening member has an annular shape.

20. The motor pump assembly according to claim 12, wherein said fastening member is the same material as said pump casing.

21. A motor pump assembly comprising:

a motor having a main shaft;

a pump casing encasing said motor and having an inner surface which contacts a fluid handled by the motor pump assembly;

at least one impeller provided on said main shaft and housed in said pump casing;

a heating element comprising a frequency converter which generates heat due to an electric loss;

a case housing said heating element; and a fastening member for fixing said case to said pump casing in such a manner that an attachment surface of said case contacts said outer surface of said pump casing by a fastening force of said fastening member;

wherein said pump casing encases said motor with a fluid passage defined therebetween, leads from said motor are extended radially across said fluid passage and connected to said heating element, and said case is provided at a portion of said pump casing at which said leads extend radially across said fluid passage.

22. A motor pump assembly comprising: a motor having a main shaft;

a pump casing encasing said motor and having an inner surface which contacts a fluid handled by the motor pump assembly;

at least one impeller provided on said main shaft and housed in said pump casing;

a heating element comprising a frequency converter which generates heat due to an electric loss;

a case housing said heating element; and a fastening member for fixing said case to said pump casing in such a manner that an attachment surface of said case contacts said outer surface of said pump casing by a fastening force of said fastening member;

wherein said case comprises at least two case members, and a sealing member interposed between said two case members, and said two case members contact with each other directly at the position where said sealing member is not located.

23. The motor pump assembly according to claim 22, wherein one of said two members contacts said outer surface of said pump casing and the other of said two members do not contact said outer surface of said pump casing, a component which generates a large amount of heat is attached to the member which is attached to said outer surface of said pump casing, and a component which generates a small amount of heat is attached to the member which do not contact said outer surface of said pump casing.

24. A motor pump assembly comprising:

a motor having a main shaft;

a pump casing encasing said motor and having an inner surface which contacts a fluid handled by the motor pump assembly;

at least one impeller provided on said main shaft and housed in said pump casing;

a heating element which generates heat due to an electric loss;

a case housing said heating element; and a fastening member for fixing said case to said pump casing in such a manner that an attachment surface of said case contacts said outer surface of said pump casing by a fastening force of said fastening member;

wherein said case has a hole, said pump casing has a projecting member projecting outwardly from the outer surface thereof, and said projecting member is fitted into said hole of said cover so that said case is located at a predetermined position relative to said outer surface of said pump casing.

25. A motor pump assembly comprising:

a motor having a main shaft;

a pump casing encasing said motor and having an inner surface which contacts a fluid handled by the motor pump assembly;

at least one impeller provided on said main shaft and housed in said pump casing;

a heating element comprising a frequency converter which generates heat due to an electric loss;

a case housing said heating element; and a fastening member for fixing said case to said pump casing in such a manner that an attachment surface of said case contacts said outer surface of said pump casing by a fastening force of said fastening member;

wherein said fastening member has respective ends which are fixed to said case, and a fastening mechanism is provided at an intermediate portion of said fastening member so that said fastening force of said fastening member is adjusted.

\* \* \* \* \*